US012127535B2

(12) United States Patent
Howe et al.

(10) Patent No.: US 12,127,535 B2
(45) Date of Patent: *Oct. 29, 2024

(54) METHOD AND SYSTEM FOR EXTERNAL FISH PARASITE MONITORING IN AQUACULTURE

(71) Applicant: Intervet Inc., Madison, NJ (US)

(72) Inventors: Russel Howe, Glendale, CA (US); Zachary Lizer, Burbank, CA (US); James Wallace Sarrett, Sunland, CA (US); Peter Jon Abrahamson, Burbank, CA (US); Jascha Tucker Little, Austin, TX (US)

(73) Assignee: INTERVET INC., Rahway, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/769,314

(22) PCT Filed: Dec. 19, 2018

(86) PCT No.: PCT/EP2018/085821
§ 371 (c)(1),
(2) Date: Jun. 3, 2020

(87) PCT Pub. No.: WO2019/121900
PCT Pub. Date: Jun. 27, 2019

(65) Prior Publication Data
US 2020/0288679 A1 Sep. 17, 2020

Related U.S. Application Data

(60) Provisional application No. 62/608,424, filed on Dec. 20, 2017.

(30) Foreign Application Priority Data
Jan. 30, 2018 (EP) .................................... 18154115

(51) Int. Cl.
A01K 61/13 (2017.01)
(52) U.S. Cl.
CPC .................................... A01K 61/13 (2017.01)
(58) Field of Classification Search
CPC ........ A01K 61/13; A01K 61/90; A01K 61/95; A01K 61/10; A01K 29/005
See application file for complete search history.

(56) References Cited

U.S. PATENT DOCUMENTS 5,142,299 A    8/1992  Braun
6,061,086 A    5/2000  Reimer et al.
(Continued)

FOREIGN PATENT DOCUMENTS

CN    103704164 A    4/2014
CN    203528826 U    4/2014
(Continued)

OTHER PUBLICATIONS

Extended European search report for 18154115.2 dated Aug. 3, 2018, 11 pages.
(Continued)

Primary Examiner — David J Parsley
Assistant Examiner — Shada Mohamed Alghailani
(74) Attorney, Agent, or Firm — Keith O'Doherty; Jenny Cromsigt

(57) ABSTRACT

A method for external fish parasites, such as sea lice, monitoring in aquaculture, comprising the steps of: —submerging a camera (52) in a sea pen (40) comprising fish (72, 74); —capturing images of the fish (72, 74) with the camera (52); and —identifying external fish parasites such as sea lice on the fish (72, 74) by analyzing the captured images, characterized by the steps of: —distinguishing between at least two different classes of external fish parasites such as sea lice which differ in the difficulty of recognizing the (Continued)

external fish parasites such as sea lice; —calculating quality metrics for each captured image, the quality metrics permitting to identify the classes of external fish parasites such as sea lice for which the quality of the image is sufficient for sea lice detection; and —establishing separate detection rates for each class of sea lice, each detection rate being based only on images the quality of which, as described by the quality metrics, was sufficient for detecting external fish parasites such as sea lice of that class.

21 Claims, 9 Drawing Sheets

(56) References Cited

U.S. PATENT DOCUMENTS

| | | | |
|---|---|---|---|
| 9,072,281 | B2 | 7/2015 | Beck |
| 10,372,967 | B1 | 8/2019 | Vácha et al. |
| 11,297,806 | B2 | 4/2022 | Messana et al. |
| 2005/0025357 | A1 | 2/2005 | Landwehr et al. |
| 2008/0137104 | A1 | 6/2008 | Lillerud et al. |
| 2013/0050465 | A1* | 2/2013 | Beck ............... A01K 61/90 348/81 |
| 2013/0273599 | A1 | 10/2013 | Robitaille et al. |
| 2015/0037806 | A1 | 2/2015 | Pollak et al. |
| 2015/0180581 | A1 | 6/2015 | Steiner et al. |
| 2015/0363914 | A1* | 12/2015 | Boyle ............... G01C 11/02 345/629 |
| 2016/0350914 | A1 | 12/2016 | Champlin et al. |
| 2017/0103257 | A1* | 4/2017 | Kasin ............... G06V 40/70 |
| 2017/0161545 | A1 | 6/2017 | Champlin et al. |
| 2017/0293217 | A1* | 10/2017 | Gallager ............... G06V 20/698 |
| 2018/0000055 | A1 | 1/2018 | Tanase et al. |
| 2018/0211380 | A1 | 7/2018 | Tandon et al. |
| 2018/0314136 | A1 | 11/2018 | Liu et al. |
| 2019/0277624 | A1* | 9/2019 | Kitagawa ............... A01K 61/95 |
| 2019/0302265 | A1 | 10/2019 | Jansson et al. |
| 2020/0170226 | A1 | 6/2020 | Aas |
| 2020/0267947 | A1* | 8/2020 | Krossli ............... A01K 61/95 |
| 2020/0337274 | A1 | 10/2020 | Howe et al. |
| 2021/0068375 | A1 | 3/2021 | Jans et al. |
| 2022/0213449 | A1 | 7/2022 | Suri et al. |

FOREIGN PATENT DOCUMENTS

| | | |
|---|---|---|
| CN | 203606673 U | 5/2014 |
| CN | 204292009 U | 4/2015 |
| CN | 104602513 A | 5/2015 |
| CN | 204350851 U | 5/2015 |
| CN | 104730536 A | 6/2015 |
| CN | 105164521 A | 12/2015 |
| CN | 105813651 A | 7/2016 |
| CN | 206284117 U | 6/2017 |
| CN | 107135988 A | 9/2017 |
| CN | 206517525 U | 9/2017 |
| EP | 2178362 A1 | 4/2010 |
| EP | 2962556 A1 | 1/2016 |
| ES | 2552405 A1 | 11/2015 |
| NO | 20050517 L | 1/2005 |
| NO | 331345 B1 | 12/2011 |
| NO | 332103 B1 | 6/2012 |
| NO | 342604 B1 | 6/2018 |
| RU | 2700086 C2 | 9/2019 |
| WO | 2003048762 A2 | 6/2003 |
| WO | 2005025309 A1 | 3/2005 |
| WO | 2009008733 A1 | 1/2009 |
| WO | 2011115496 A1 | 9/2011 |
| WO | 2012087427 A1 | 6/2012 |
| WO | 2014/204319 A1 | 12/2012 |
| WO | 2013/053597 A1 | 4/2013 |
| WO | 2014033535 A2 | 3/2014 |
| WO | 2014/098614 A1 | 6/2014 |
| WO | 2014121371 A1 | 8/2014 |
| WO | 2014/198556 A1 | 12/2014 |
| WO | 2015/009160 A1 | 1/2015 |
| WO | 2015091898 A1 | 6/2015 |
| WO | 2016048851 A1 | 3/2016 |
| WO | 2016116533 A1 | 7/2016 |
| WO | 2016189146 A1 | 12/2016 |
| WO | 2017068127 A1 | 4/2017 |
| WO | 2017199019 A1 | 11/2017 |
| WO | 2017204660 A1 | 11/2017 |
| WO | 2018222048 A1 | 12/2018 |
| WO | 2019121844 A1 | 6/2019 |
| WO | 2019121851 A1 | 6/2019 |
| WO | 2019121854 A1 | 6/2019 |
| WO | 2019121887 A1 | 6/2019 |
| WO | 2019121900 A1 | 6/2019 |
| WO | 2019245722 A1 | 12/2019 |

OTHER PUBLICATIONS

International Search Report for PCT/EP2018/085821 dated Mar. 25, 2019, 17 pages.
Naval, P.C., and David, L.T., FishDrop: Estimation of Reef Fish Population Density and Biomass using Stereo Cameras, Techno-Ocean, 2016, pp. 527-531.
B. Saugen, Optical Sorting of Farmed Salmon from Rivers, Experience from the River Suldalslag in 2012, 2013, Powerpoint slides 1-20, -, BioSort AS.
Machine translation for Norwegian Patent NO332103B1.
Machine translation for Spanish Patent ES2552405A1.
Powerpoint report BioSort 2013, Optical sorting of farmed salmon from river, experiences from Suldalslagen 2012.
Tillett, et al., An optical method for the detection of sea lice, *Lepeophtheirus salmonis*, Aquacultural Engineering, 1999, pp. 33-48, 21.
Aaen, et al., Drug resistance in sea lice: a threat to salmonid aquaculture, 2015, pp. 72-81, vol. 31, No. 2.
Cox et al., A Report to Havbruksinstituttet AS and FHF Norway, Population Interpretation of Passive Sea Lice Monitoring, Mar. 2013, pp. 1-22.
Extended European Search Report for 15191108.0 mailed on Apr. 12, 2016.
Extended European Search report for 18153724.2 dated Aug. 2, 2018, 10 pages.
Extended European Search report for 18154085.7, received on Aug. 6, 2018, 14 pages.
Extended European Search report for EP18154093.1 dated Aug. 3, 2018, 11 pages.
Fallang, A., Evidence for occurrence of an organophosphate-resistant type of acetylcholinesterase in strains of sea lice (*Lepeophtheirus salmonis* Kroyer), 2004, pp. 1163-1170, vol. 60.
Greaker, M., Environmental policy and innovation in Norwegian fish farming: Resolving the sea lice problem?, 2020, pp. 1-10.
International search report and written opinion for PCT/EP2018/085730 dated Feb. 15, 2019, 15 pages.
International search report and written opinion for PCT/EP2018/085740 dated Feb. 20, 2019, 13 pages.
International Search report for PCT/EP2016/075385 dated Jan. 17, 2017, 14 pages.
International Search Report for PCT/EP2018/085800 received on Feb. 21, 2019, 16 pages.
Lam, C.T., Sea lice exposure to non-lethal levels of emamectin benzoate after treatments: a potential risk factor for drug resistance, 2020, pp. 1-8, Scientific Reports.
Marine Scotland, The Regulation of Sea Lice in Scotland, 2019, Topic Sheet No. 71, pp. 1-2, Scottish Government Riaghaltas.
Ramsden, N., Norway's salmon farmers spent over NOK 5bn on sea lice treatments in 2015, Mar. 2016, pp. 1-3, Undercurrent News.
The Guardian, Salmon farming in crisis: 'We are seeing a chemical arms race in the seas', 2016, pp. 1-5.
Worldwide Aquaculture, Sealice, 2020, pp. 1-2.

* cited by examiner

METHOD AND SYSTEM FOR EXTERNAL FISH PARASITE MONITORING IN AQUACULTURE

CROSS-REFERENCE TO RELATED APPLICATIONS

This application is a national stage entry under 35 U.S.C. § 371 of PCT/EP2018/085821, filed on Dec. 19, 2018, which claims priority to U.S. Ser. No. 62/608,424, filed on Dec. 20, 2017, and EP18154115.2 filed on Jan. 30, 2018, the content of PCT/EP2018/085800 is hereby incorporated by reference in its entirety.

TECHNICAL FIELD

The invention relates to a method for external fish parasite, such as sea, monitoring in aquaculture, comprising the steps of:
  submerging a camera in a sea pen comprising fish (72, 74);
  capturing images of the fish (72, 74) with the camera (52); and
  identifying external fish parasite, such as sea lice on the fish (72, 74) by analyzing the captured images.

In this specification, the term "monitoring" designates any activity that aims at providing an empirical basis for a decision whether or not a given population of fish is infested with external parasites. The term monitoring may also include a way of determining to which extent a fish is infested with external parasites. Although the monitoring may be combined with measures for destroying or killing the parasites, the term monitoring in itself does not include such measures.

BACKGROUND

Like humans and other animals, fish suffer from diseases and parasites. Parasites can be internal (endoparasites) or external (ectoparasites). Fish gills are the preferred habitat of many external fish parasites, attached to the gill but living out of it. The most common are monogeneans and certain groups of parasitic copepods, which can be extremely numerous. Other external fish parasites found on gills are leeches and, in seawater, larvae of gnathiid isopods. Isopod fish parasites are mostly external and feed on blood. The larvae of the Gnathiidae family and adult cymothoidids have piercing and sucking mouthparts and clawed limbs adapted for clinging onto their hosts. *Cymothoa exigua* is a parasite of various marine fish. It causes the tongue of the fish to atrophy and takes its place in what is believed to be the first instance discovered of a parasite functionally replacing a host structure in animals. Among the most common external fish parasites are the so called sea lice.

Sea lice are small, parasitic crustaceans (family Caligidae) that feed on the mucus, tissue, and blood of marine fish. A sea louse (plural sea lice) is a member within the order Siphonostomatoida, the Caligidae. There are around 559 species in 37 genera, including approximately 162 Lepeophtheirus and 268 *Caligus* species. While sea lice are present within wild populations of salmon, sea lice infestations within farmed salmon populations present especially significant challenges. Several antiparasitic drugs have been developed for control purposes. *L. salmonis* is the major sea louse of concern in Norway. *Caligus rogercresseyi* has become a major parasite of concern on salmon farms in Chile.

Sea lice have both free swimming (planktonic) and parasitic life stages. All stages are separated by moults. The development rate for *L. salmonis* from egg to adult varies from 17 to 72 days depending on temperature. Eggs hatch into nauplius I which moult to a second naupliar stage; both naupliar stages are non-feeding, depending on yolk reserves for energy, and adapted for swimming. The copepodid stage is the infectious stage and it searches for an appropriate host, likely by chemo- and mechanosensory clues.

Once attached to the host the copepodid stage begins feeding and begins to develop into the first chalimus stage. Copepods and chalimus stages have a developed gastrointestinal tract and feed on host mucus and tissues within range of their attachment. Pre-adult and adult sea lice, especially gravid females, are aggressive feeders, in some cases feeding on blood in addition to tissue and mucus.

The time and expense associated with mitigation efforts and fish mortality increase the cost of fish production by approximately 0.2 EURO/kg. Accordingly, sea lice are a primary concern of contemporary salmon farmers, who dedicate considerable resources to averting infestations and complying with government regulations aimed at averting broader ecological impacts.

Both effective mitigation (e.g. assessing the need and timing of vaccination or chemical treatments) and regulatory compliance are reliant upon accurate quantification of external fish parasites such as sea lice populations within individual farming operations. Presently, counting external fish parasites such as sea lice is a completely manual and therefore time consuming process. For example, in Norway, counts must be performed and reported weekly, presenting an annual direct cost of 24 M $ alone. Equally troublesome is the questionable validity of statistics based on manual counts, when a count of external fish parasites such as adult female sea lice on a sample of between 10 and 20 sedated fish is extrapolated to determine appropriate treatment for populations of over 50,000 fish. Consequently, both over-treatment and under-treatment are common.

WO 2017/068127 A1 describes a system of the type indicated in the preamble of claim 1, aimed at enabling automated and accurate detection and counting of sea lice within fish populations.

Any such system based on optical imaging must overcome several substantial challenges associated with marine environments and animal behavior.
  Optical distortion from density gradients. The turbulent mixing of warm and cold water or, especially, salt and fresh water (e.g. within fjords) generates small scale density variations causing optical distortion. The impact upon the imaging of objects of less than 1-3 mm (e.g. juvenile sea lice) is especially severe.
  Fish aversion to unfamiliar light sources. Fish may exhibit a fear response or more general aversion to light sources of unfamiliar location, intensity, or spectra. Distortion of fish shoals around such a light source will generally increase the typical imager-to-fish distance, decreasing the effective acuity of the imaging system. The cited document addresses this problem by providing a guide system for guiding the fish along a desired imaging trajectory.
  Focus tracking in highly dynamic, marine environments. Commercially available focus-tracking systems do not perform well in highly dynamic scenes in which a large number of quickly moving, plausible focus targets (i.e. a school of swimming fish) are concurrently present within the field of view.

It is an object of the invention to provide a system and method addressing these challenge and providing accurate automated counts in order reduce the amount of human labor associated with external fish parasites such as sea lice counts and enable more effective prediction and prevention of harmful infestations.

SUMMARY

In order to achieve this object, the method according to the invention is characterized by the steps of:
- distinguishing between at least two different classes of external fish parasites such as sea lice which differ in the difficulty of recognizing the external fish parasites such as sea lice;
- calculating quality metrics for each captured image, the quality metrics permitting to identify the classes of external fish parasites such as sea lice for which the quality of the image is sufficient for external fish parasites such as sea lice detection; and
- establishing separate detection rates for each class of external fish parasites such as sea lice, each detection rate being based only on images the quality of which, as described by the quality metrics, was sufficient for detecting external fish parasites such as sea lice of that class.

The invention helps to avoid the occurrence of statistical artefacts which would otherwise be result from the fact certain classes of external fish parasites such as sea lice, e.g. small-sized juvenile external fish parasites such as sea lice, escape from detection simply because they are too small to be recognized in images with poor image resolution. In the invention, the statistics for the classes of external fish parasites such as sea lice that are easy to detect can be based on a large sample of images and will therefore have low statistical noise, which makes it easier, for example, to detect changes in the amount of infestation over the time. On the other hand, the statistics for the classes that are difficult to detect gives a more realistic picture for these classes, though with somewhat more statistical noise.

More specific optional features of the invention are indicated in the dependent claims.

Preferably, the system is able to detect and categorize external fish parasites such as sea lice of both sexes at various sessile, mobile, and egg-laying life stages (e.g. juvenile, pre-adult, adult male, adult female egg-bearing, and adult female non-egg-bearing).

Furthermore, the system could form the basis of an integrated decision support platform improving the operational performance, animal health, and sustainability of ocean-based aquaculture.

BRIEF DESCRIPTION OF THE DRAWINGS

Embodiment examples will now be described in conjunction with the drawings, wherein.

DETAILED DESCRIPTION

Image Capture System

Figure 1:
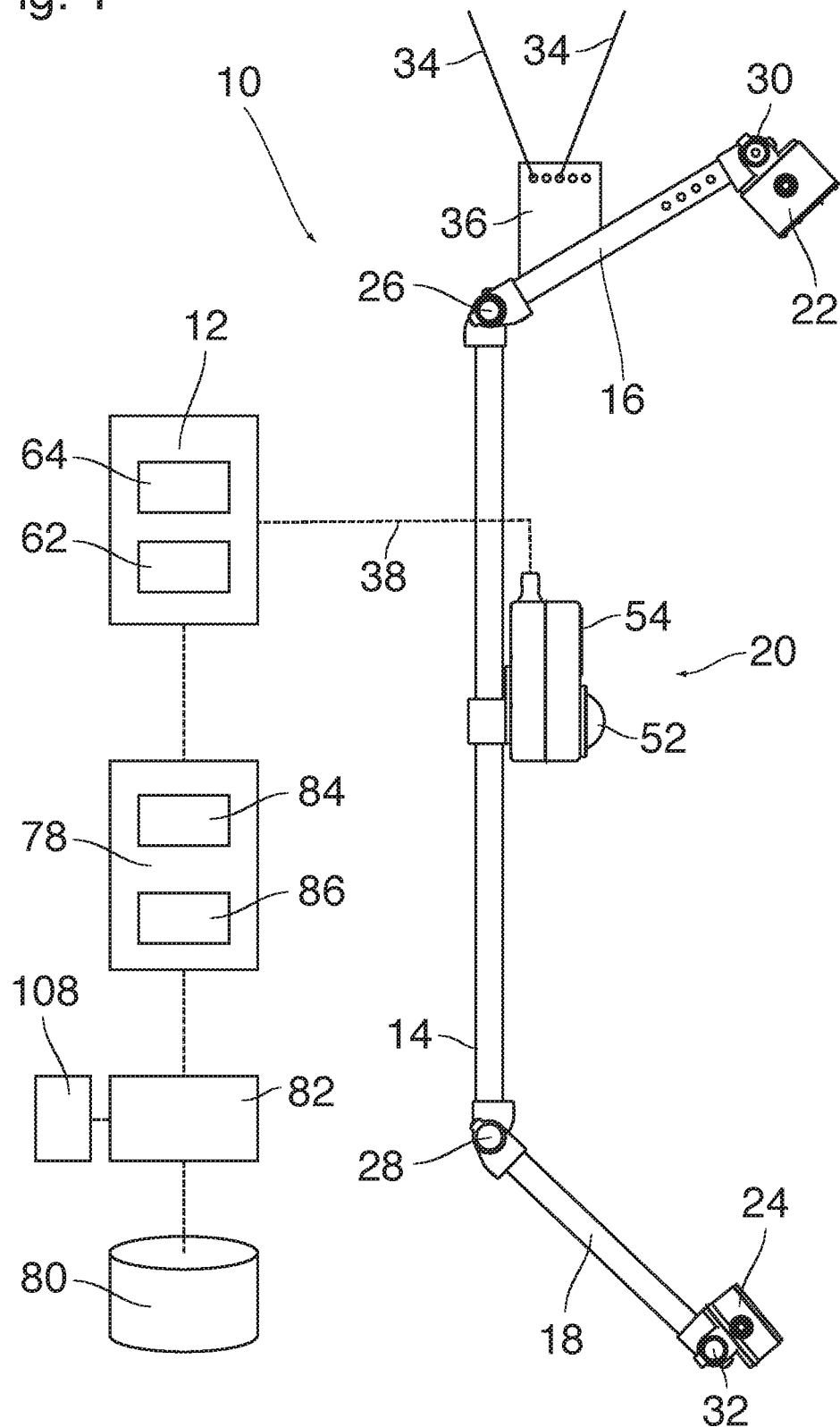
FIG. 1 shows a side view of a camera and lighting rig according to a preferred embodiment of the invention.

As shown in FIG. 1, an image capture system comprises a camera and lighting rig 10 and a camera and lighting control system 12 enabling automated acquisition of high-quality images of fish.

The camera and lighting rig 10 comprises a vertical support member 14, an upper boom 16, a lower boom 18, a camera housing 20, an upper lighting array 22, and a lower lighting array 24. The camera housing 20 is attached to the vertical support member 14 and is preferably adjustable in height. The vertical positioning of the camera is preferably such that the field of view of the camera is at least partially (preferably mostly or entirely) covered by the lighting cones of the upper and lower lighting arrays 22, 24. Also, there is preferably a substantial angular offset between the centerline of the camera field of view and the centerlines of the lighting cones. This minimizes the amount of light backscattered (by particulates in the water) to the camera, maximizing (relatively) the amount of light returned from the fish tissue. In the shown setup, the camera may be mounted at a height, as measured from the blower end of the support member 14, between ¼ and ¾ of the length of the vertical support member.

The upper boom 16 and lower boom 18 couple with the vertical support 14 member at elbow joints 26 and 28, respectively, that allow angular articulation of the upper boom and lower boom relative to the vertical support member. The upper lighting array 22 and lower lighting array 24 couple to the upper boom and lower boom at pivotable joints 30 and 32, respectively, that allow angular articulation of the upper lighting array and lower lighting array relative to the upper boom and lower boom.

In the example shown, suspension ropes 34 constitute a bifilar suspension for the camera and lighting rig 10. The suspension ropes permit to control the posture of the rig in azimuth and can be attached to a bracket 36 in different positions, thereby to keep the rig in balance for the given configuration of the booms 16 and 18. This enables fine adjustment of the orientation (i.e. pitch angle) of the camera and lighting rig as the center of mass of the camera and lighting rig centers below the attachment point.

Preferably, a cabling conduit 38 carries all data and power required by the upper lighting array, lower lighting array, and camera housing between the camera and lighting rig and the camera and lighting control system 12.

Figure 2:
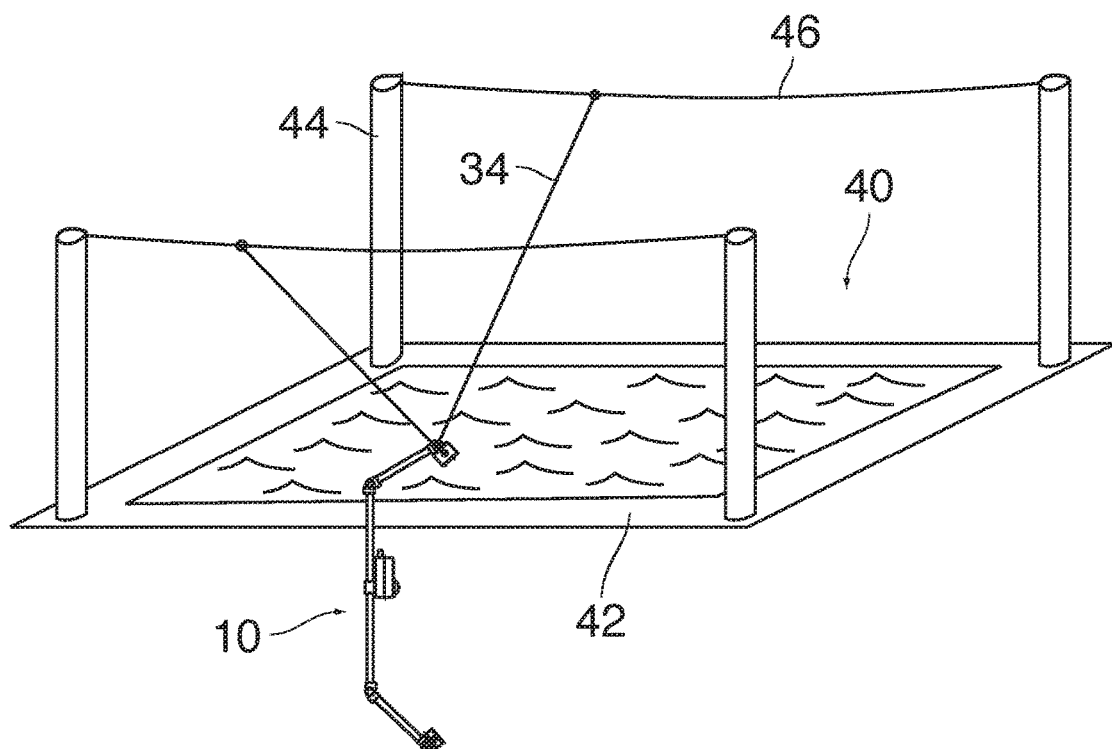
FIG. 2 is a view of a sea pen with the rig according to FIG. 1 suspended therein.

FIG. 2 shows a diagram of the camera and lighting rig 10 immersed in a sea pen 40. The exemplary sea pen shown is surrounded by a dock 42 from which vertical support members 44 extend upward. Tensioned cables 46 span between the support members. The suspension ropes 34 can attach to the tensioned cables 46 to allow insertion and removal of the camera and lighting rig 10 into the sea pen as well as to control the horizontal position of the rig relative to the dock 42.

It should be noted, however, that the sea pen may also have a shape different from what is shown in FIG. 2.

Extension of the supporting cables and ropes also allows adjustment of the depth of the camera and lighting rig below the water surface. Preferably, the camera and lighting rig is placed at a depth that positions the camera housing 20 below the surface mixing layers where the turbulent mixing of warm and cold water or salt and fresh water is most pronounced. This further reduces the optical distortion associated with density gradients. The required depth varies based on location and season, but typically a depth of 2-3 m is preferred.

Figure 3:
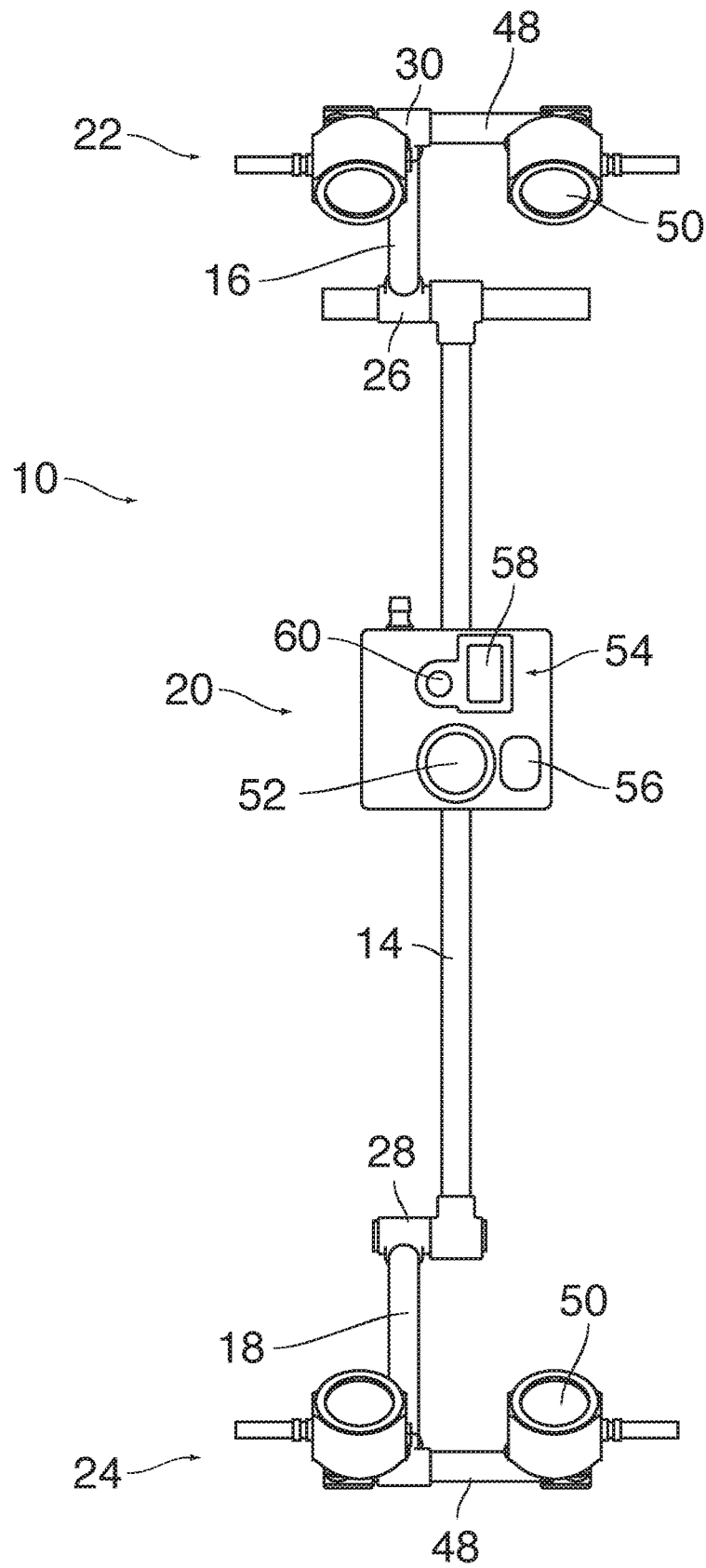
FIG. 3 shows a front view of the camera and lighting rig.

As is shown in FIG. 3, the upper lighting array 22 and lower lighting array 24 comprise horizontal members 48 that support one or more lighting units 50 within a lighting array along their length. In the embodiment shown in FIG. 3, the upper lighting array and lower lighting array each comprise two lighting units 50, however, different numbers of lighting units may be used. The horizontal members 48 couple to the upper boom and lower boom at the pivotable joints 30, 32.

The elbow joints 26, 28 between the vertical support member 14 and upper boom 16 and lower boom 18 and the pivotable joints 30, 32 between the upper boom and lower boom and the horizontal members 48 collectively allow for independent adjustment of:

- the horizontal offset between the camera housing 20 and the upper lighting array 22,
- the horizontal offset between the camera housing 20 and the lower lighting array 24,
- the angular orientation of the lighting units 50 within the upper lighting array 22, and
- the angular orientation of the lighting units 50 within the lower lighting array 24.

Generally, the upper lighting array and lower lighting array are positioned relative to the camera housing to provide adequate lighting within a target region where fish will be imaged for external fish parasites such as sea lice detection. The lengthwise-vertical design and configuration of the camera and lighting rig 10 maximizes the likelihood that fish (that exhibit aversion to long, horizontally oriented objects) will swim in close proximity to the camera housing. Furthermore, the separate and independently adjustable upper lighting array and lower lighting array allow for lighting schemes specifically designed to address lighting challenges unique to fish, as discussed in greater detail below.

The camera housing 20, which is shown in a front view in FIG. 3, comprises a camera 52, a ranging detector 54, e.g. a light-based time-of-flight detection and ranging unit, and a posture sensing unit 56 including for example a magnetometer and an inertial measurement unit (IMU) or other known posture sensing systems.

The camera is preferably a commercially available digital camera with a high-sensitivity, low-noise sensor, capable of capturing sharp images of fast moving fish in relatively low lighting. In a preferred embodiment of the invention, a Raytrix C42i camera is used, providing a horizontal field of view of approximately 60° and a vertical field of view of approximately 45°. Of course, any other camera with similar properties (including electronically controllable focus) may be used as an alternative.

The ranging detector 54 is used to detect the range and bearing of fish swimming within the field of view of the camera 52. The detector comprises emit optics 58 and receive optics 60. The emit optics 58 produce a fan of light oriented in the vertical direction but preferably collimated in horizontal direction. That is, the fan diverges in pitch, parallel to the vertical support member, but diverges relatively little in yaw, perpendicular to the vertical support member.

The receive optics 60 comprises an array of light detector elements, each detecting light incident from within an acceptance angle spanning at least a portion of the vertical field of view of the camera. The angles of adjacent detector elements abut one another in pitch, collectively creating an acceptance fan that completely covers the vertical field of view. This orientation and configuration of the emit and receive optics is optimized to detect and locate the bodies of fish (which are generally high aspect ratio) swimming parallel to the horizontal water surface.

Preferably, the ranging detector 54 operates on a wavelength of light providing efficient transmission within water. For example, blue light or green light may be used to provide efficient transmission within sea water. In the preferred embodiment of the invention, the ranging detector is a LEDDAR® detector such as LeddarTech M16, emitting and receiving light at 465 nm. Of course, the invention is not limited to this embodiment of a ranging detector.

Also in the preferred embodiment of the invention, the illumination fan generated by the emit optics diverges approximately 45° in pitch, effectively spanning the vertical field of view of the camera, and diverges approximately 7.5° in yaw. The receive optics 60 comprises and array of 16 detector elements, each with a field of view spanning approximately 3° in pitch and approximately 7.5° in yaw. Of course, the number of detector elements may be smaller or larger than 16, but preferably not smaller than 4. Preferably, both the illumination fan and the acceptance fan are horizontally centered within the camera field of view, ensuring that detected fish can be completely captured by the camera.

Systems with two or more ranging detectors may also be envisaged. For example, a fan could be positioned 'upstream' (as defined by prevailing direction of fish swimming) of the centerline, to provide 'advanced warning' of a fish entering the frame. Similar, a unit could be placed downstream to confirm fish exiting the frame.

The IMU in the posture sensing unit 56 comprises an accelerometer and gyroscope, e.g. similar to those found in commercially available smart phones. In a preferred embodiment of the invention, the magnetometer and IMU are collocated on a single printed circuit board within the camera housing 20. Collectively, the IMU and magnetometer measure the orientation of the camera housing (and therefore the imagery acquired by the camera) relative to the water surface and the sea pen. Because fish generally swim parallel to the water surface and along the edges of the sea pen, this information can be used to inform a machine vision system of an expected fish orientation within the acquired imagery.

The upper lighting array 22 and lower lighting array 24 can include one or more lights of various types (e.g. incandescent, gas discharge, or LED) emitting light at any number of wavelengths. Preferably, the specific types of lights are chosen to provide sufficient color information (i.e. a broad enough emittance spectrum) for the external fish parasites such as sea lice to be adequately contrasted against the fish tissue. Additionally, the types and intensity of the lights within the upper lighting array and lower lighting array are preferably selected to yield a relatively uniform intensity of light reflected to the camera despite the typical, markedly countershaded bodies of the fish.

In the embodiment proposed here, the upper lighting array 22 comprises a pair of xenon flashtubes. The lower lighting array 24 comprises a pair of LED lights, each comprising a chip with 128 white LED dies. This hybrid lighting system provides a greater range of lighting intensity than can be attained with a single lighting type. Specifically, the flashtubes provide brief but intense illumination (approximately 3400 lx) from above the fish, synchronized to the operation of the camera shutter. This ensures adequate light reflected to the camera from the typically dark, highly absorptive upper surfaces of the fish. (This requires a greater intensity of light than could be delivered by the LED lights of the lower lighting array.) Correspondingly, the LED lights provide an adequate lighting intensity for the typically light, highly reflective lower surfaces of the fish. (This requires an intensity below what could be provided by the xenon flashtubes of the upper lighting array.) The resulting uniformly bright light reflected from the fish allows the camera to operate at a relatively low sensitivity (e.g. below ISO 3200) to provide low-noise images to the machine vision system. Finally, both the xenon flashtubes and LED lights provide an adequately broad spectrum to allow discrimination of the external fish parasites such as sea lice from fish tissue.

Figure 4:
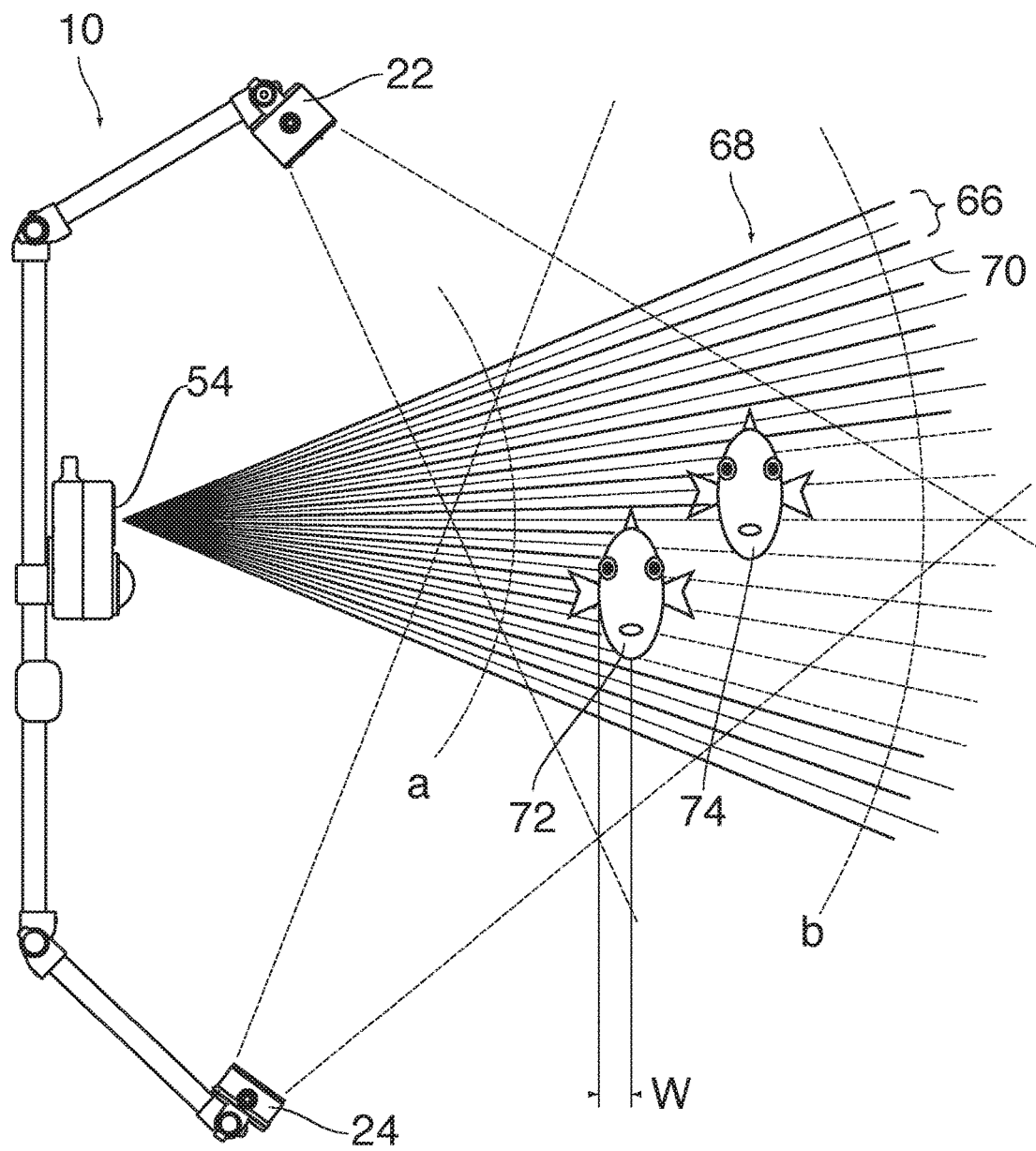
FIG. 4 shows a side view of an angular field of view of a ranging detector mounted on the rig.

As described above, the upper lighting array 22 and lower lighting array 24 are positioned to provide the desired illumination across the target region. The target region is characterized by the vertical field of view of the camera and near and far bounds along the axis of the camera. The distance from the camera to the near bound is the further of (a) the closest attainable focus distance of the camera and (b) the distance at which a typical fish spans the entire horizontal viewing angle of the camera. The distance from the camera to the far bound is the distance at which the angular resolution of the camera can no longer resolve the smallest external fish parasites such as sea lice that must be detected. The near bound "a" and the far bound "b" are illustrated in FIG. 4.

Each of the lights within the upper lighting array and lower lighting array provide a generally axisymmetric illumination pattern. Because there are multiple lights within each array along the length of the horizontal members, the illumination pattern can be effectively characterized by an angular span in the pitch plane. The length of the vertical support member 14, the angular position of the upper boom 16 and lower boom 18, and the angular orientation of the upper lighting array 22 and lower lighting array 24 are preferably adjusted such that the angular span of the upper lighting array and lower lighting array effectively cover the target region. The distance from the camera to the "sweet spot depends on the size of the fish to be monitored and may be in a range from 200 mm to 2000 mm for example. In the case of salmon, for example, a suitable value may be around 700 mm.

In practice, the intensity of the illumination provided by the upper lighting array and lower lighting array are not completely uniform over their angular span. The above approach, however, ensures that an acceptable amount of illumination is provided over the target region. It also results in a "sweet spot" a short distance beyond the near bound where the angle of illumination between the upper lighting array, lower lighting array, and camera are optimal. This results in the best lit images also providing the best angular resolution attainable by the camera and suffering minimally from density gradient distortions.

A wide variety of other camera and lighting geometries may be utilized without departing from the scope of the invention. In particular, the camera and lighting rig may be constructed for and positioned in orientations other than the vertical orientation of FIG. 1. For example, the camera and lighting rig may be oriented horizontally, parallel to the water surface. The camera and lighting rig may also be constructed to maintain one or more cameras in fixed positions (relative to the target area) other than those shown in FIG. 1. Additionally, some embodiments of the invention may incorporate multiple camera and lighting rigs, e.g. two camera and lighting rigs symmetrically positioned in front and in back of the target region, enabling simultaneous capture of imagery on both sides of a single fish.

Camera and Lighting Control System

The camera and lighting control system 12 controls the operation of the image capture system. The camera and lighting control system:

receives and analyzes data from the ranging detector 54 to determine an appropriate camera focus distance, controls the camera focus and shutter, controls the timing of the illumination of the upper lighting array 22 and the lower lighting array 24 relative to the shutter of the camera 52, and receives, analyzes, and stores image data and image metadata, including ranging detector, magnetometer, and IMU measurements.

In the present embodiment, the camera and lighting control system 12 comprises a computer 62 and a power control unit 64 that reside at a dry location (e.g. the dock 42) physically proximal to the camera and lighting rig 10. In an alternative embodiments, at least a portion of the camera and lighting control system functionality provided by the computer is performed by an embedded system below the water surface (e.g. mounted to the vertical support member 14 or integrated within the camera housing. Generally, the computer 62 includes device drivers for each sensor within the camera and lighting rig 10. In particular, the computer includes device drivers for the camera 52, the ranging detector 54, and the magnetometer and the IMU of the posture sensing unit 56. The device drivers allow the computer to acquire measurement data from and send control data to the associated sensors. In a preferred embodiment, measurement data and control data are passed between the devices and processes running on the computer as messages in the Robotic Operating System (ROS). Data from the sensors (including the ranging detector) arrive at a frequency of 10 Hz, and measurements from the magnetometer and IMU arrive at 100 Hz. Each of the messages is logged to disk on the computer.

The computer 62 provides control signals to the power control unit 64 and optionally receives diagnostic data from the power control unit. The power control unit provides power via the cabling 38 to the upper lighting array 22 and the lower lighting array 24. In the preferred embodiment, the power control unit receives 220 V AC power, which can pass directly to a charger for a capacitor bank for the xenon flashtubes within the upper lighting array 22 (when triggered). The power control unit passes power to an underwater junction box (not shown) that transforms the AC power to DC power (e.g. 36 V or 72 V) for the LED lights within the upper lighting array 24.

A focus calculation process, executed by the computer 62, continuously monitors the ranging data to detect the presence and determine the range of fish within the target region. The ranging data consists of one or more distances, for each detector element, from which light was reflected back to the detector element from within its acceptance angle within the acceptance fan.

FIG. 4 shows a side view of the angular fields of view 66 of the detector elements in the receive optics 60 within a ranging acceptance fan 68. As described above, the acceptance angles of adjacent detectors abut one another in pitch to create the acceptance fan. FIG. 4 shows an array of 16 detectors, each with a field of view spanning approximately 3° in pitch.

FIG. 4 shows average pitch angles of the detectors within the ranging acceptance fan 68. Each average pitch angle is illustrated by a centerline 70 bisecting the field of view 66 of the corresponding detector. The average pitch angle is the angle between the bisecting centerline 70 and the centerline of the acceptance fan 68 as a whole, which is generally parallel to the optical axis of the camera 52.

FIG. 4 also shows a side view of the distances and average pitch angles for several detector elements occluded by fish 72, 74 within the ranging acceptance fan 68. Generally, the focus calculation process detects fish when several adjacent detector elements report similar distances. In the preferred embodiment of the invention, a fish is detected when M or more adjacent detector elements report similar distances $d_i$. The number M may be in the range from 1 to ½ the total number of detectors (i.e. 8 in this example). Specifically, the focus calculation process looks for adjacent sets of M or more adjacent distances $d_i$ for which $[\max(d_i)-\min(d_i)]\leq W$. M and W are parameters that can be adjusted by the operator of the image capture system, with W representing a maximum allowable thickness approximately corresponding to half the thickness of the largest fish that will be detected. Depending on the size or age of the fish the parameters M and W are optimized for each system or pen. For each such detection, the focus calculation computes the mean distance $$D=(1/M)\Sigma_1^M d_i$$

and a mean bearing $$\beta=(1/M)\Sigma_1^M \beta_i$$

where $\beta$ are the average pitch angles of each of the adjacent detector elements. The focus calculation process then returns the focus distance $D_f=D*\cos \beta$, which represents the distance from the camera to the recommended focus plane along the optical axis of the camera.

Multiple distances may be reported by a single detector due to scattered particulates in the water or an object (e.g. a fish) that subtends only a portion of the acceptance angle of the detector. In a practical embodiment, in those instances where a single detector reports multiple distances, the focus calculation uses the furthest distance. This minimizes the number of false detections induced by particulates within the water. In the event that the multiple distances are actually associated with two fish, one of which occludes only a portion of the detector's acceptance angle, it is likely that neighboring detectors will still successfully detect the partially occluding fish.

The fish presence and range information determined by the focus calculation process can be used to control the image acquisition of the camera. For example, images may be captured only when a fish is detected within a predetermined distance of the "sweet spot" providing optimal lighting. For example, if the "sweet spot" is at 700 mm, images may be captured only when a fish is detected within a distance range from 600 to 800 mm. Whenever images are captured, the camera and lighting control system sets the focus distance of the camera to the most recent range value determined by the focus calculation process.

In a preferred embodiment of the invention, the camera and lighting control system continually triggers the camera to acquire images on a periodic basis, for example, at a frequency of 4 Hz or more generally, a frequency between 2 and 10 Hz. The focus calculation process continually and periodically (e.g. at 10 Hz or, more generally, at 4 to 20 Hz) reports a current focus distance based on the most recent fish detection and ranges, and the camera and lighting control system sets the focus distance of the camera to the latest available focus distance.

When the camera shutter opens, the camera sends a synchronization signal to the camera and lighting control system 12, which is passed to the power control unit 64. The power control unit illuminates the upper lighting array 22 and lower lighting array 24 synchronized with the shutter, to ensure proper illumination of the captured image. In those embodiments of the invention where the lights within the upper lighting array or lower lighting array are not able to maintain a duty cycle equal to the camera (such as the xenon flashtubes of the preferred embodiment of the invention), the power control unit can also include a lighting inhibitor process that continually assesses whether the power control unit should illuminate the upper lighting array and lower lighting array. In a preferred embodiment of the invention, illumination is inhibited if either (a) the firing history of the xenon flashtubes within the upper lighting array is nearing their thermal limit or (b) the focus calculation process has not recently detected a fish and reported an updated range.

In a preferred embodiment of the invention, the less intense LED lights within the lower lighting array are illuminated for the duration of the camera exposure. The length of the exposure is set at the minimum length required for the LED lights to provide adequate illumination. The flash length of the xenon flashtubes in the upper lighting array is adjusted to provide balanced lighting given the countershading of a typical fish.

The intensity of the illumination provided by the LED lights within the lower lighting array is preferably great enough to provide a short enough exposure to yield acceptably low motion blur within the captured images of swimming fish. In the preferred embodiment of the invention, the sensor within the camera (in particular its pixel count), the optics of the camera (in particular the angular span of the field of view) and the distance to the target region are chosen to ensure that (a) a full fish can be captured within the field of view of the camera yet (b) even juvenile external fish parasites such as sea lice can be adequately resolved. Providing 10 pixels across each 2 mm (comparable to the size of a juvenile sea lice) at a target distance at which the 60° horizontal field of view of the camera spans the width of a typical adult fish requires an angular pixel spacing of $7.6\times10^{-3\circ}$ per pixel. For fish swimming at typical speed of 0.2 m/sec, sub-pixel motion blur is ensured with shutter times of less than $0.6\times10^{-3}$ s. To deliver adequately low-noise imagery to the machine vision system, a sensor gain of less than ISO 3200 is preferred. This in turn requires illumination of approximately 3000 lux across the target region.

Figure 5:
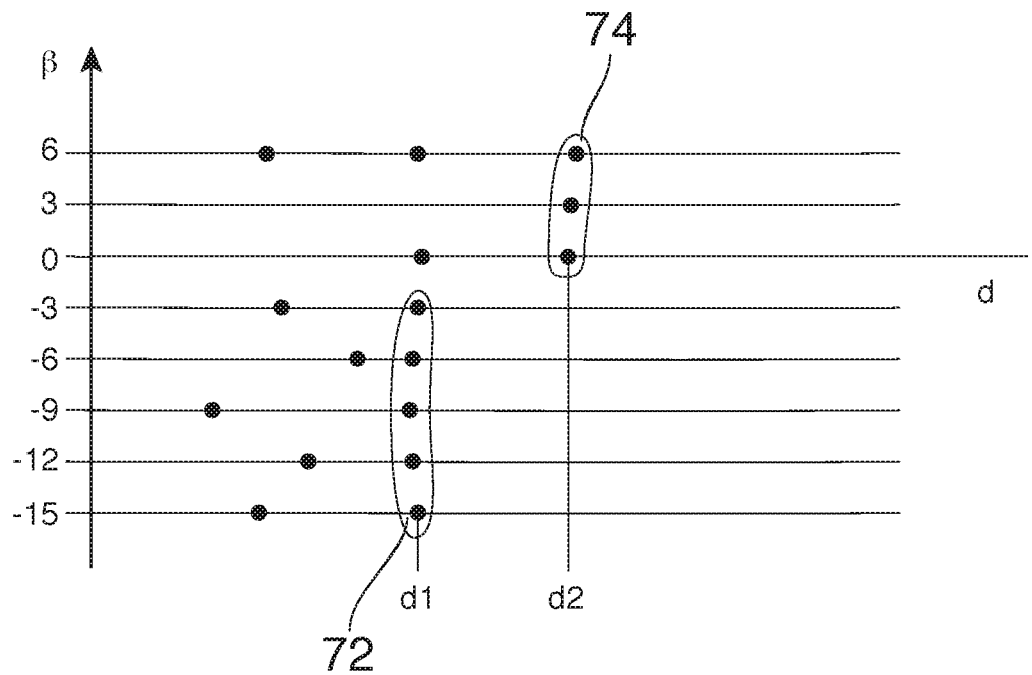
FIGS. 5 and 6 are diagrams illustrating detection results of the ranging detector.

FIG. 5 illustrates the results that would be obtained with the ranging detector 54 in the situation depicted in FIG. 4. What has been shown are the detection results of detector elements with the fields of view having center lines ranging from +6° to −15°. Each black dot in FIG. 5 represents a detection event where reflected light has been received by the pertinent detector element. The position of the dot in the direction of the d-axis represents the distance of the detected object as calculated from the run time of the light signal from the emit optics 58 to the object and back to the receive optic 60.

As has been described before, the fish 72 and 74 are represented by detections at approximately the same distance d1 and d2, respectively, for a number of adjacent detectors. For each individual detector, the distance of the fish is the largest among the distances measured by that detector. The dots at smaller distances represent noise caused by small particulate matter in the acceptance fan.

In the situation illustrated in FIGS. 4 and 5, the fish 74 is partly obscured by the fish 72, so that an image of the entire silhouette of the fish can be obtained only for the fish 72 at the smaller distance d1. Consequently, the focus of the camera will be adjusted to that distance d1.

Figure 6:
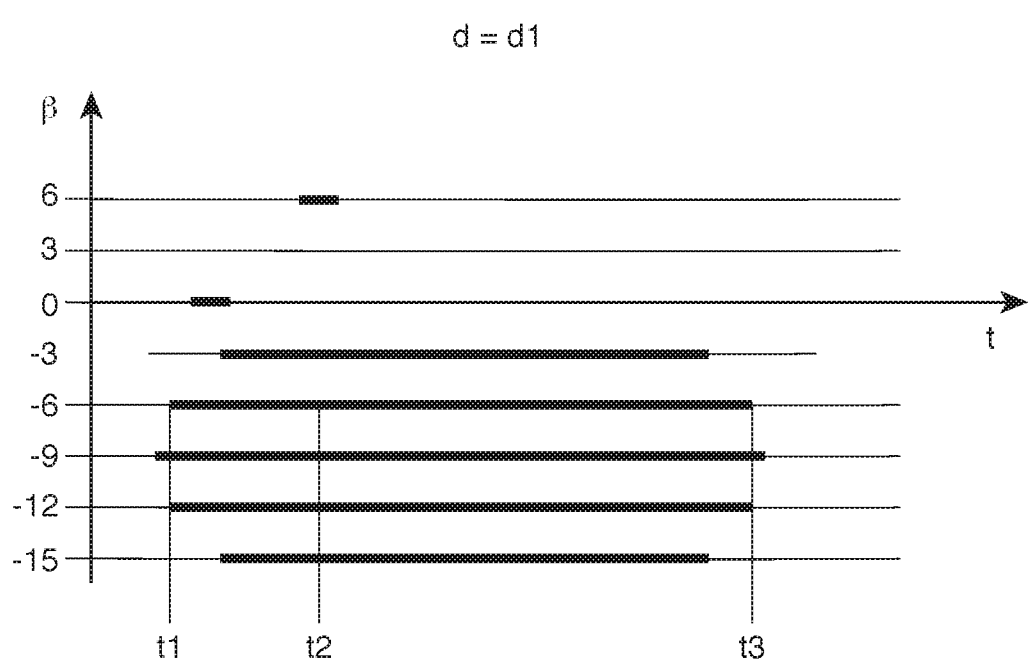

FIG. 6 is a time diagram showing the detections at the distance d1 as a function of time t. It can be seen that the detections obtained from the fish 72, for angles β ranging from −3° to −15°, are stable over an extended period of time corresponding to the time which it takes the fish to swim through the acceptance fan 68. Consequently, the noise might also be filtered-out by requiring that the detection is stable over a certain minimum time interval or, equivalently, by integrating the signal received from each detector element over a certain time and then thresholding the integration result.

In principle, a detection history of the type illustrated in FIG. 6 might also be used for optimizing the time interval in which the camera 52 takes a sequence of pictures, in order to assure that, on the one hand, the number of pictures does not become unreasonably large and, on the other hand, that the sequence of pictures includes at least one picture in which the entire fish is within the field of view of the camera. For example, as shown in FIG. 6, a timer may be started at a time t1 when a certain number of adjacent detector elements (three) detect an object that could be a fish. Then, the camera may be triggered with a certain delay, at a time t2, to start with taking a sequence of pictures, and the sequence will be stopped at the latest at a time t3 when the detector elements indicate that the tail end of the fish is leaving the acceptance fan.

Figure 7:
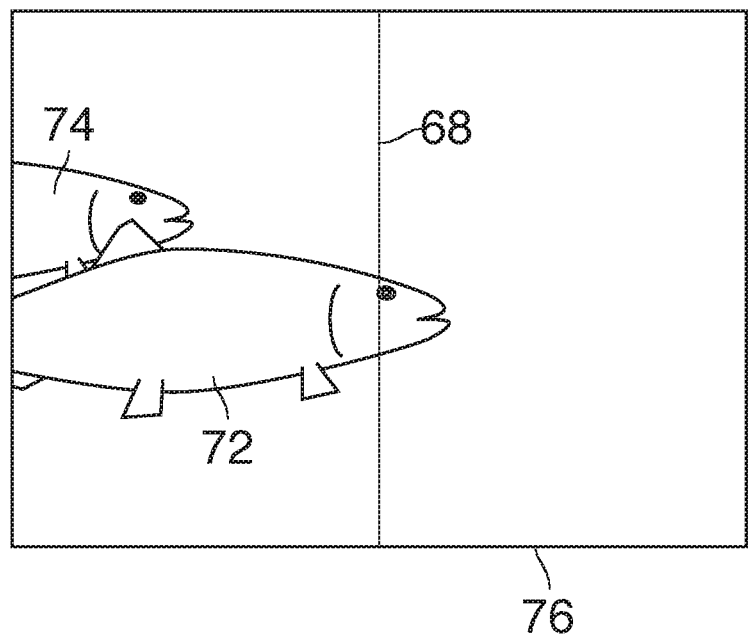
FIGS. 7-10 show image frames illustrating several steps of an image capturing and analyzing procedure.

FIG. 7 shows a field of view 76 of the camera at the time t1 in FIG. 6, when the nose of the fish 72 has just crossed the acceptance fan 68.

Figure 8:
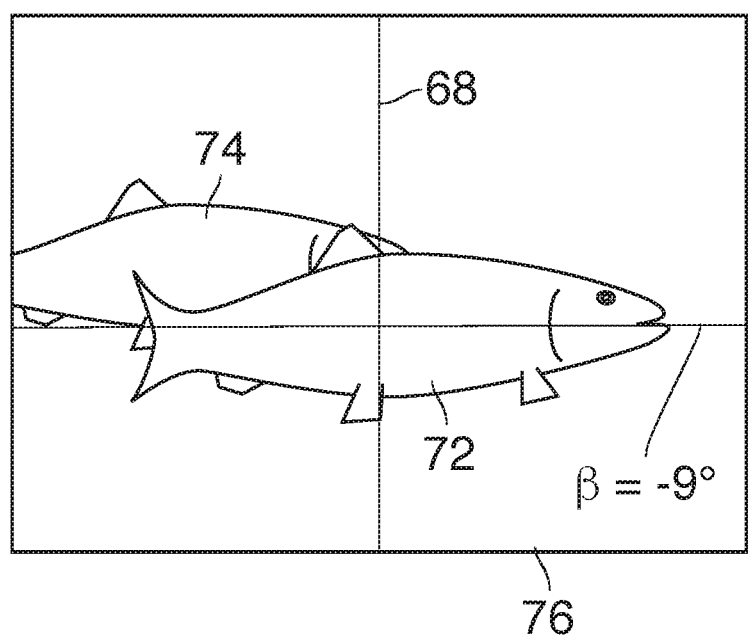

FIG. 8 shows an image captured by the camera 52 at a time somewhat later than t2 in FIG. 6, when the entire silhouette of the fish 72 is within the field of view 76. At that instant, it can be inferred from the detection results of the detector elements at β=−3° to −15° in FIG. 6 that the center line of the fish will be at β=−9°, as shown in FIG. 8. This information can be passed-on to the image processing system and may help to recognize the contour of the fish in the captured image.

Returning to FIG. 1, the computer 62 of the camera and lighting control system 12 is connected to an image processing system 78 which has access to a database 80 via a data management system 82.

Data Management System

The automated system for detecting and counting external fish parasites such as sea lice also includes the data management system 82 which includes interfaces supporting the acquisition, storage, search, retrieval, and distribution of image data, image metadata, image annotations, and the detection data created upon operation of the image processing system 78.

Datastore

The data management system 82 receives imagery from the image capture system, for example, in the form of ROS "bags". The data management system unpacks each bag into, for example, a JPEG or PNG image and JSON (JavaScript Object Notation) metadata. Each of the JPEG images is stored within a datastore.

Database

The JSON metadata unpacked from each ROS bag is stored within the database 80 associated with the datastore. Generally, the metadata describes the image capture parameters of the associated JPEG or PNG image. For example, the metadata includes an indication of the centroid pixel location within the silhouette of the fish (e.g. the pixel centered horizontally within the image, longitudinal center line of the fish) detected by the LEDDAR unit. This pixel location may optionally be used by the image processing system (described in more detail below) to facilitate the detection of fish within the image.

The database 80 also stores annotation data created during an annotation process for training the image processing system 78 (described in greater detail below). The database additionally stores information characterizing the location, size, and type of fish and external fish parasites such as sea lice detected by the machine vision system. Finally, the database stores authentication credentials enabling users to log in to the various interfaces (e.g. the annotation interface or the end-user interface) via an authentication module.

Image Processing System

In a certain embodiment, the invention uses the image processing system 78 to perform the task of external fish parasites such as sea lice detection. In the preferred embodiment of the invention, separate neural nets are trained to provide a fish detector 84 and an external fish parasites detector 86. The fish detector first 84 detects individual fish within imagery acquired by the image capture system. The external fish parasites detector 86 then detects individual external fish parasites such as sea lice (if present) on the surface of each detected fish. Preferably, the external fish parasites detector also classifies the sex and life stage of each detected louse.

The detectors are trained via a machine learning procedure that ingests a corpus of human-annotated images. Use of a neural net obviates the need to explicitly define the characteristics (e.g. extent, shape, brightness, color, or texture) of fish or external fish parasites such as sea lice, but instead draws directly upon the knowledge of the human annotators as encoded within the corpus of annotated images.

Figure 9:
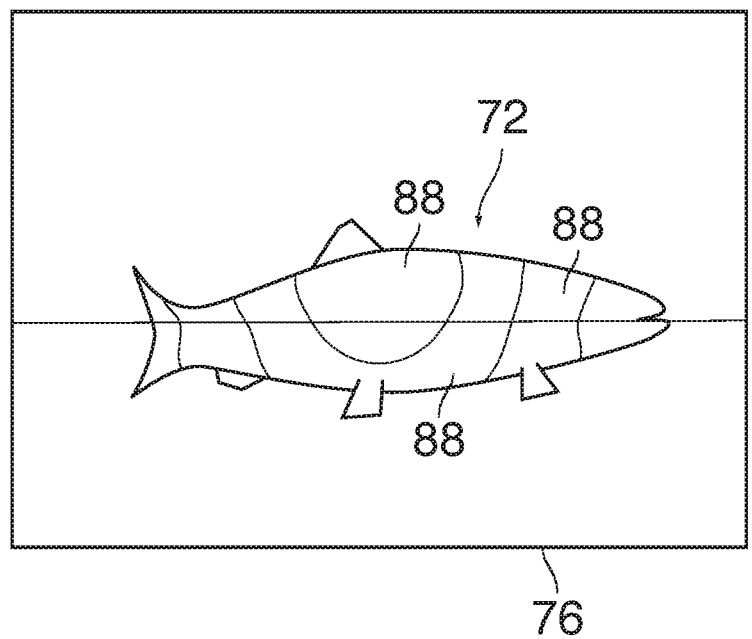

FIG. 9 shows the position and silhouette of the fish 72 in the field of view 76, as detected by the fish detector 84. The other fish 74 shown in FIGS. 4, 7 and 8 has been excluded from consideration in this embodiment because it is partly occluded by the fish 72. In a modified embodiment, it would be possible, however, to detect also the fish 74 and to search for external fish parasites such as sea lice on the skin of the fish 74, as far as it is visible.

In one embodiment of the invention, the depth of focus of the camera 52 has been selected such that a sharp image is obtained for the entire silhouette of the fish 72. In a modified embodiment, as shown in FIG. 9, the silhouette of the fish, as recognized by the fish detector, is segmented into sub-areas 88 which differ in their distance from the camera 52. The distances in the different sub-areas 88 are calculated on the basis of the ranging result obtained from the ranging detector 54. The distance values obtained by the various detector elements of the ranging detector reflect already the effect of the angular deviation between the center line 70 of the field of view and the optical axis of the camera in the pitch direction. Further, for each point within the silhouette of the fish 72, the effect of the angular deviation in horizontal direction can be inferred from the position of the pixel on the fish in the field of view 76. Optionally, another distance correction may be made for the relief of the body of the fish in horizontal direction, which relief is at least roughly known for the species of fish in consideration.

Then, when a series of images is taken from the fish 72 (e.g. with a frequency of 4 Hz as described above), the focus may be varied from image to image so that the focus is respectively adapted to one of the sub-areas 88 in FIG. 9. This permits to obtain high resolution images of all sub-areas 88 of the fish with reduced depth of focus and, accordingly, with an aperture setting of the camera which requires less illumination light intensity.

Figure 10:
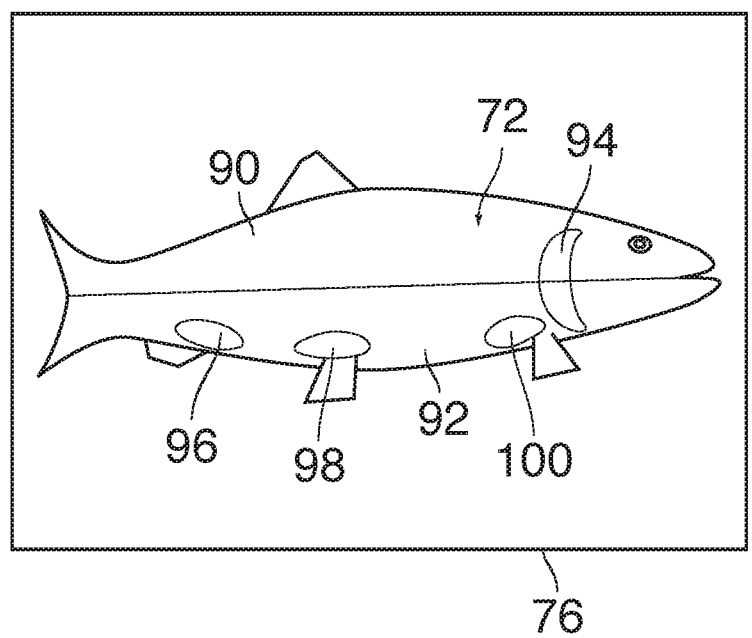

FIG. 10 shows a normalized image of the fish 72 that is eventually submitted to the external fish parasites detector 86. This image may optionally be composed of several images of the sub-areas 88 captured with different camera focus. Further, the image shown in FIG. 10 may be normalized in size to a standard size, which facilitates comparison of the captured image of the fish with the annotated images.

It will be observed that the image of the fish 72 as recognized in FIG. 9 may be subject to distortion (horizontal compression) if the orientation of the fish is not at right angles to the optical axis of the camera. The normalization process resulting in the silhouette of the fish as shown in FIG. 10 may compensate for this distortion.

Further, FIG. 10 illustrates an optional embodiment in which the silhouette of the fish has been segmented into different regions 90, 92 and 94-100. The regions 90 and 92 allow the image processing system to distinguish between the top side and the bottom side of the fish for which, on the one hand, the skin color of the fish will be different and, on the other hand, the illumination intensities and spectra provided by the upper and lower lighting arrays 22 and 24 will be different. Knowledge of the region 90 or 92 where the pixel on the fish is located makes it easier for the external fish parasites detector 86 to search for characteristic features in the contrast between external fish parasites such as sea lice and the fish tissue.

The further regions 94-100 shown in this example designate selected anatomic features of the fish which correlate with characteristic population densities of the external fish parasites such as sea lice of different species on the fish. The same anatomic regions 94-100 will also be identified on the annotated images used for machine learning. This allows the external fish parasites detector to be trained or configured such that confidence levels for the detection of external fish parasites such as sea lice are adapted to the region that is presently under inspection.

Moreover, when the external fish parasites detector 86 is operated in the inference mode, it is possible to provide separate statistics for the different regions 94-100 on the fish, which may provide useful information for identifying the species, sex and/or life stage of external fish parasites such as sea lice and/or extent of infestation.

Annotation, Training, Validation, and Testing

Figure 11:
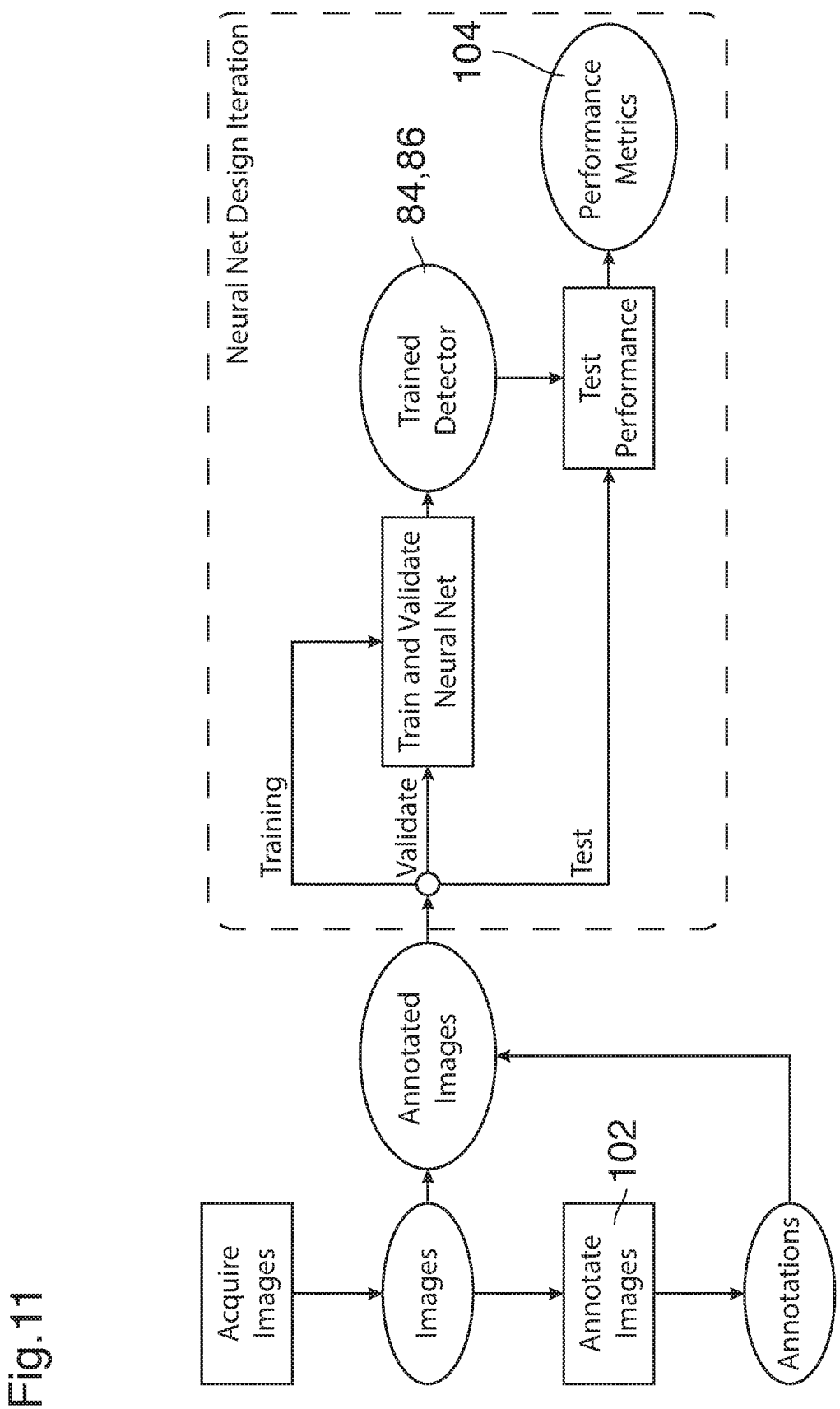
FIG. 11 shows a flow chart detailing a process of annotating images and training, validating, and testing a external fish parasites detector within an electronic image processing system (machine vision system) according to an embodiment of the invention.

FIG. 11 shows a flow chart detailing the annotation of images and the training, validation, and testing of the detectors 84, 86 within the image processing system 78. The annotation and training process begins with the acquisition of images. An annotation interface 102 allows humans to create a set of annotations that, when associated with the corresponding images, yields a corpus of annotated images.

In the preferred embodiment of the invention, the annotation interface communicates with a media server that connects to the datastore in the database 80. The annotation interface may be HTML-based, allowing the human annotators to load, view, and annotate images within a web browser. For each image, the annotator creates a polygon enclosing each prominently visible fish, and a rectangular bounding box enclosing any external fish parasites such as sea lice present on the surface of the fish. Preferably, the annotation interface also allows the annotator to create rectangular bounding boxes enclosing fish eyes (which may be visually similar to external fish parasites such as sea lice). Preferably, the annotator also indicates the species, sex, and life stage of each louse.

The annotations created using the annotation interface 102 are stored within the database 80. Upon insertion and retrieval from the database, the annotations for a single image are serialized as a JSON object with a pointer to the associated image. This eases the ingest of the annotated corpus by the machine learning procedure.

In the preferred embodiment of the invention, the machine learning procedure comprises training neural nets on the corpus of annotated images. As shown in FIG. 11, the annotated images may be divided into three sets of images. The first two sets of images are used to train and validate a neural network. More specifically, the first set of images (e.g. approximately 80% of the annotated images) is used to iteratively adjust the weights within the neural network. Periodically (i.e. after a certain number of additional iterations) the second set of images (approximately 10% of the annotated images) are used to validate the evolving detector, guarding against over-fitting. The result of the training and concurrent validation process is a trained detector 84, 86. The third set of images (e.g. approximately 10% of the annotated images) is used to test the trained detector. The testing procedure characterizes the performance of the trained detector, resulting in a set of performance metrics 104.

As shown in FIG. 11, the entire training, validation, and testing process may be iterated multiple times, as part of a broader neutral network design process, until acceptable performance metrics are attained. As noted above, in the preferred embodiment of the invention, the process of FIG. 11 is performed at least once to produce the fish detector 84 and at least once to produce the external fish parasites detector 86.

In alternative embodiments of the invention, to improve the quality of the training, validation, and testing process, the machine learning procedure includes a data augmentation process to increase the size of the annotated corpus. For example, applying augmentation techniques such as noise addition and perspective transformation to the human-annotated corpus can increase the size of the training corpus by as much as a factor of 64.

Operation

Once the annotation, training, validation, and testing process of FIG. 11 is complete, the detectors can be run in inference mode to detect fish and external fish parasites such as sea lice in newly acquired (un-annotated) images.

Specifically, each image to be processed is first passed to the fish detector 84. If the fish detector locates one or more patches within the image it considers to be fish, the image is passed to the external fish parasites detector 86 with fish silhouettes (and optionally regions 90-100) delineated.

Figure 12:
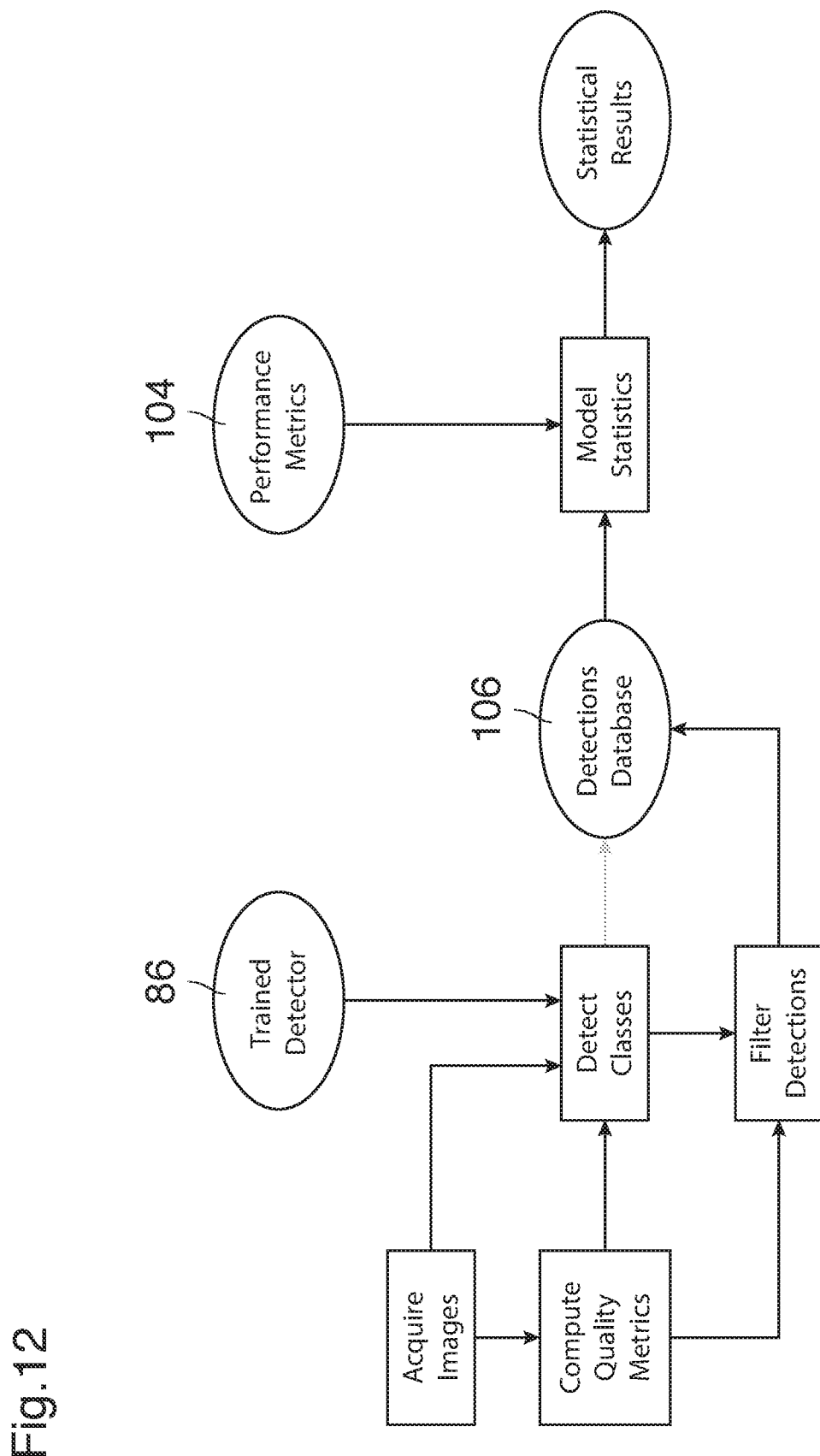
FIG. 12 shows a flow chart detailing the operation of the external fish parasites detector in an inference mode.

FIG. 12 shows a flow chart detailing the operation of the external fish parasites detector 86 in inference mode within the image processing system 78. The image processing system first computes image quality metrics for each of the acquired images. The quality metrics assess the suitability of the images for use in detecting the various life stages of external fish parasites such as sea lice on a fish. In the preferred embodiment of the invention, the image quality metrics include:

Fraction of overexposed pixels. The fraction of pixels within the image with luminance values over a maximum allowable value (e.g. 250 for pixels with an 8 bit bit-depth)

Fraction of underexposed pixels. The fraction of pixels within the image with luminance values below a minimum allowable value (e.g. 10 for pixels with an 8 bit bit-depth)

Focus score; a measure of the quality of focus within the image, computed using the variance of pixel values or the variance of the output of a Laplacian filter applied to the pixel values.

The acquired image, the corresponding image quality metrics, and the trained detector from the training, validation, and testing procedure are passed to a detection operation that detects one or more classes of external fish parasites such as sea lice (i.e. external fish parasites such as sea lice at a particular life stage) within a region, e.g. 90, of the image identified by the fish detector. The detections are then filtered based on the image quality metrics; if the image quality metrics indicate that an image is of insufficient quality to allow reliable detection of a particular class of external fish parasites such as sea lice, detections of that class are excluded. In excluding a detection, the image is fully excluded from detection rate calculations for that class. (That is, the detection is excluded from the numerator of the detection rate, and the image is excluded from the denominator of the detection rate). The filtered detections may be stored in a detections database 106.

The image processing system 78 then combines the detections within the detection database with the performance metrics 104 from the training, validation, and testing procedure to model the statistics of the external fish parasites such as sea lice population. Based on the known performance metrics, the machine vision system extrapolates from the detection rates within the acquired images to the actual incidence of external fish parasites such as sea lice within fish population.

As noted above, the image processing system 78 can optionally use the fish location information determined by the ranging detector to inform its detection of fish. Specifically, the fish detector can lower the confidence threshold required for detecting a fish in the neighborhood of the longitudinal center line reported for each image.

In embodiments of the invention incorporating multiple cameras with differing orientations, the image processing system can also use the orientation information reported by the posture sensing unit 56 within the camera housing 20 upon image capture. For example, because fish typically swim parallel to the water surface, the orientation information can be used to bias fish detection in favor of high-aspect-ratio patches with the longer axis oriented perpendicular to the gravity vector. Determining the orientation of the fish relative to the camera also enables an image processing system with fish detector incorporating multiple neural nets, each trained for a specific fish orientation (e.g. for the relatively dark upper surface or the relatively light lower surface). Fish orientation may also inform the operation of external fish parasites detector as external fish parasites such as sea lice are more likely to attach to specific locations on the fish.

End-User Interface

Finally, the system according to the invention may include includes an end-user interface 108 (FIG. 1). The end-user interface provides access to the results of the detection operations within the machine vision system. For example, a media server connecting to the database 80 and datastore can present images with machine-generated annotations indicating regions in the image where fish and external fish parasites such as sea lice were detected. The end-user interface can also provide summary statistics (e.g. fish counts, external fish parasites such as sea lice counts, infestation rates) for a fish population of interest (e.g. within an individual sea pen or across an entire farm).

In the preferred embodiment of the invention, the end-user interface also includes tools that ease regulatory compliance. For example, the results of the detection operations of the image processing system may be automatically summarized and transmitted to regulatory authorities on the required forms. The end-user interface can also include predictive analytics tools, forecasting infestation rates for the fish population, forecasting the resulting economic impact, and evaluating possible courses of action (e.g. chemical treatments). The end-user interface can also integrate with a broader set of aquaculture tools (e.g. tools monitoring biomass, oxygen levels, and salinity levels).

Optionally, the end-user interface includes the annotation interface 102 described above, allowing advanced end-users to improve or extend the performance of the machine vision system. Also optionally, the end-user interface can include an interface allowing adjustment of the parameters governing the behavior of the camera and lighting control system.

The invention claimed is:

1. A method for external fish parasites monitoring in aquaculture, the method comprising:
submerging a camera (52) in a sea pen (40) suitable for containing fish (72, 74), the camera being arranged for capturing images of the fish;
identifying external fish parasites on the fish by analyzing the captured images with an electronic image processing system (78);
wherein the method further comprises and electronic control system (12) configured to:
distinguish between at least two different classes of external fish parasites which differ in difficulty of recognizing the external fish parasite;
calculate image quality metrics for each captured image, the image quality metrics permitting to identify the classes of external fish parasites for which the quality of the image is sufficient for external fish parasite detection;
determine, for a particular image, based on the image quality metrics for that particular image, which different classes of external fish parasites can be detected in the image;
establish separate detection rates for each class of external fish parasite distinguished; and wherein the detection rates for a particular class of external fish parasite are established using only images that have been determined to have sufficient image quality metrics such that parasites of that class can be detected.

2. The method according to claim 1, comprising the steps of: operating a ranging detector (54) to continuously monitor a part of the sea pen (40) for detecting the presence of fish in that part of the sea pen and, when a fish has been detected, measuring a distance from the camera (52) to the fish (72, 74); and when a fish has been detected, calculating a focus setting of the camera (52) on the basis of the measured distance; and —triggering the camera (72) when the detected fish (72, 74) is within a predetermined distance range.

3. The method according to claim 2, wherein the ranging detector (54) is used for measuring a bearing angle of a detected fish (72), and the measured bearing angle is used in the machine vision system (78) for searching for the silhouette of the fish in the captured image.

4. The method according to claim 2, wherein a target region bounded by a field of view of the camera (52) and by said predetermined distance range is illuminated from above and below with light of different intensities and/or spectral compositions.

5. The method according to claim 4, wherein a step of detecting the presence of external fish parasite at a given location on the fish includes distinguishing whether said given location is in a top side region (90) or a bottom side region (92) of the fish.

6. A system for external fish parasites monitoring in aquaculture, the system comprising:
a camera (52) submerged in a sea pen (40) suitable for containing fish (72, 74), the camera being arranged for capturing images of the fish;
and an electronic image processing system (78) configured for identifying external fish parasites on the fish by analyzing the captured images, characterized by an electronic control system (12) configured to
distinguish between at least two different classes of external fish parasites which differ in difficulty of recognizing the external fish parasite;
calculate image quality metrics for each captured image, the image quality metrics permitting to identify the classes of external fish parasites for which the quality of the image is sufficient for external fish parasite detection;
determine, for a particular image, based on the image quality metrics for that particular image, which different classes of external fish parasites can be detected in the image;
establish separate detection rates for each class of external fish parasite distinguished;
wherein the detection rates for a particular class of external fish parasite are established using only images that have been determined to have sufficient image quality metrics such that parasites of that class can be detected.

7. The system according to claim 6, wherein the electronic image processing system (78) comprises a fish detector (84) configured to recognize a silhouette of a fish in the captured image, and a external fish parasite detector (86) configured to detect external fish parasite in a specified region (90-100) within the silhouette of the fish (72).

8. The system according to claim 7, wherein the electronic image processing system (78) includes a neural network trained to recognize the external fish parasites.

9. The system according to claim 7, wherein the electronic image processing system (78) comprises a neural network constituting the fish detector (84).

10. The system according to claim 6, comprising:
a ranging detector (54) configured for detecting the fish and measuring a distance from the detector to the fish is mounted adjacent to the camera (52); and the electronic control system (12) is arranged to control a focus of the camera (52) on the basis of the measured distance from the detector to the fish and to trigger the camera (52) when the fish has been detected within a predetermined distance range.

11. The system according to claim 10, wherein the ranging detector (54) comprises a light-based time-of-flight ranging and detection unit having:
LED emit optics (58) for emitting light; and
receive optics (60) adapted to receive reflected light and to measure a time of flight of the reflected light received by the receive optics.

12. The system according to claim 11, wherein the emit optics (58) is configured to emit light in fan spread form over an extended angular range in vertical direction and collimated in horizontal direction.

13. The system according to claim 12, wherein the receive optics (60) includes a plurality of detector elements having adjacent fields of view (66) which collectively form a vertically oriented acceptance fan (68), the ranging detector being adapted to measure bearing angles (B) under which reflected light is detected by individual detector elements of the plurality of detector elements.

14. The system according to claim 6, comprising a camera and lighting rig (10) having a vertical support member (14), an upper boom (16) articulated to a top end of the support member (14) and carrying an upper lighting array (22), a lower boom (18) articulated to a lower end of the support member (14) and carrying a lower lighting array (24), and a housing (20) attached to the support member and carrying the camera (52), wherein the upper and lower lighting arrays (22, 44) are configured to illuminate, from above and from below, a target region inside a field of view of the camera (52).

15. The system according to claim 14, wherein the upper lighting array (22) is configured to emit light with an intensity and/or spectral composition different from that of the light emitted by the lower lighting array (24).

16. The system according to claim 15, wherein the upper lighting array (22) comprises a flash lighting unit, and the lower lighting array (24) comprises an LED lighting unit.

17. The system according to claim 14, comprising a posture sensing unit (56) adapted to detect a posture of the camera and lighting rig (10) relative to the sea pen (40).

18. The system according to claim 10, wherein the electronic control system (12) is configured to control the camera (52) so as to capture a sequence of images in an extended time interval in which the ranging detector (54) continuously detects the fish within the predetermined distance range.

19. The system according to claim 10, comprising a camera and lighting rig (10) having a vertical support member (14), an upper boom (16) articulated to a top end of the support member (14) and carrying an upper lighting array (22), a lower boom (18) articulated to a lower end of the support member (14) and carrying a lower lighting array (24), and a housing (20) attached to the support member and carrying the camera (52), wherein the upper and lower lighting arrays (22, 44) are configured to illuminate, from above and from below, a target region inside a field of view of the camera (52).

20. The system according to claim 6, wherein the quality metrics include one or more of: a fraction or overexposed pixels, a fraction of underexposed pixels, or a focus score.

21. The method according to claim 1, comprising the steps of: training a neural network to recognize silhouettes of fish in the captured images; training a neural network to detect the external fish parasites within the silhouettes of the fish; and using the trained neural networks for analyzing the captured images.

* * * * *